(12) United States Patent
Yeh et al.

(10) Patent No.: US 8,861,211 B2
(45) Date of Patent: Oct. 14, 2014

(54) COLLAPSIBLE ELECTRONIC EQUIPMENT AND PIVOT STRUCTURE

(75) Inventors: Yi-Chang Yeh, Taipei Hsien (TW); Tzu-Yu Lin, Guishan Township, Taoyuan County (TW)

(73) Assignees: Acer Incorporated, Taipei Hsien (TW); Lianhong Technology Co., Ltd., Guishan Township, Taoyuan County (TW)

( * ) Notice: Subject to any disclaimer, the term of this patent is extended or adjusted under 35 U.S.C. 154(b) by 246 days.

(21) Appl. No.: 13/425,272

(22) Filed: Mar. 20, 2012

(65) Prior Publication Data

US 2013/0016489 A1  Jan. 17, 2013

(30) Foreign Application Priority Data

Jul. 13, 2011   (TW) .............................. 100212810 U

(51) Int. Cl.
*H05K 5/00* (2006.01)
*G06F 1/16* (2006.01)

(52) U.S. Cl.
CPC .................................... *G06F 1/1681* (2013.01)
USPC ....................................... 361/755; 455/575.7

(58) Field of Classification Search
USPC .................... 361/755, 679.01, 679.02, 679.4, 361/679.41, 679.6, 679.43; 455/575.1–575.3, 575.7; 439/152, 159, 439/377, 374

See application file for complete search history.

(56) References Cited

U.S. PATENT DOCUMENTS

| | | | | | |
|---|---|---|---|---|---|
| 5,987,704 | A | * | 11/1999 | Tang ................................ | 16/354 |
| 8,205,305 | B2 | * | 6/2012 | Wang et al. ..................... | 16/354 |
| 8,493,730 | B2 | * | 7/2013 | Shim et al. ................. | 361/679.55 |
| 8,578,561 | B2 | * | 11/2013 | Chuang ........................... | 16/354 |
| 8,615,848 | B2 | * | 12/2013 | Mitsui ............................. | 16/366 |
| 2009/0070961 | A1 | * | 3/2009 | Chung et al. .................... | 16/354 |
| 2011/0265288 | A1 | * | 11/2011 | Chiang ........................... | 16/341 |

* cited by examiner

*Primary Examiner* — Hung S Bui
(74) *Attorney, Agent, or Firm* — McClure, Qualey & Rodack, LLP

(57) ABSTRACT

A collapsible electronic equipment includes a pivot structure, a base and a cover. The pivot structure includes a first pivot assembly, a second pivot assembly, and a gear mechanism. The first pivot assembly is disposed on a side of the base. The second pivot assembly is disposed on a side of the cover. The gear mechanism is connected to the first pivot assembly and the second pivot assembly. The cover may be opened or closed relative to the base by the gear mechanism. When the cover is opened at 180 degrees relative to the base, the gap between the cover and the base is narrow, and the surfaces of the cover and the base are located on the same plane.

19 Claims, 14 Drawing Sheets

COLLAPSIBLE ELECTRONIC EQUIPMENT AND PIVOT STRUCTURE

CROSS-REFERENCE TO RELATED APPLICATIONS

This Application claims priority of Taiwan Patent Application No. 100212810, filed on Jul. 13, 2011, the entirety of which is incorporated by reference herein.

BACKGROUND OF THE INVENTION

1. Field of the Invention

The invention relates to electronic equipment, and in particular to collapsible electronic equipment.

2. Description of the Related Art

Touch screens are wildly used in many kinds of electronic equipments, and thus notebooks with dual screens have been developed, recently. In the notebook, a keyboard is replaced by a touch screen. A user may control the notebook via the touch screen. Further, the notebook may be used as a tablet personal computer when the cover of the notebook is opened at 180 degrees relative to the base of the notebook.

A pivot assembly of a conventional notebook with a single screen has a retaining structure. Thus, when the notebook is opened, the cover of the notebook can be tiltably kept in a predetermined position by the retaining structure. However, the cover cannot be opened at 180 degrees relative to the base of the notebook by the pivot assembly.

When the pivot assembly is applied to a notebook with dual screens, the cover of the notebook may be opened at 180 degrees relative to the base by removing the retaining structure. However, when the notebook is opened at 180 degrees, the gap between the cover and the base is wide because of the structure of the pivot assembly.

Further, the display surfaces of the cover and the base are not located on the same plane, and thus display between the screens of the cover and the base are imperfect. In addition, since the retaining structure of the pivot assembly is removed, the cover cannot be kept in a predetermined position when the cover is inclined relative to the base. Thus, the use of the notebook with dual screens is not convenient.

BRIEF SUMMARY OF THE INVENTION

To solve the problems of the prior art, the objective of the invention provides collapsible electronic equipment having a cover and a base. The cover is opened at 180 degrees relative to the base. The gap between the cover and the base is narrow, and the display surfaces of the cover and the base can be located on the same plane. Moreover, when the cover is inclined to a predetermined angle relative to the base, the cover may be kept at a predetermined position, and thus the use of the collapsible electronic equipment is convenient.

For the above objective, a collapsible electronic equipment includes a base, a cover, and a pivot structure. The base has a first base side and a second base side close to the first base side. The cover has a first cover side and a second cover side. The first cover side is substantially parallel to the first base side and is close to the second cover side. The pivot structure includes a first pivot assembly, a second pivot assembly, and a gear mechanism. The first pivot assembly is disposed on the second base side. The second pivot assembly is disposed on the second cover side. The gear mechanism is connected to the first pivot assembly and the second pivot assembly. The cover is opened or closed relative to the base by the pivot structure.

For the above objective, a pivot structure disposed on a collapsible electronic equipment includes a gear mechanism, a first pivot assembly, and a second pivot assembly. The gear mechanism has at least on connecting board and a gear set. The gear set includes a first gear, a plurality of transmitting gears and an end gear. The first gear, the transmitting gears, and the end gear are engaged in sequence. The first pivot assembly has a first shaft passing through the connecting board and the first gear. The second pivot assembly has a second shaft passing through the connecting board and the end gear.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1A:
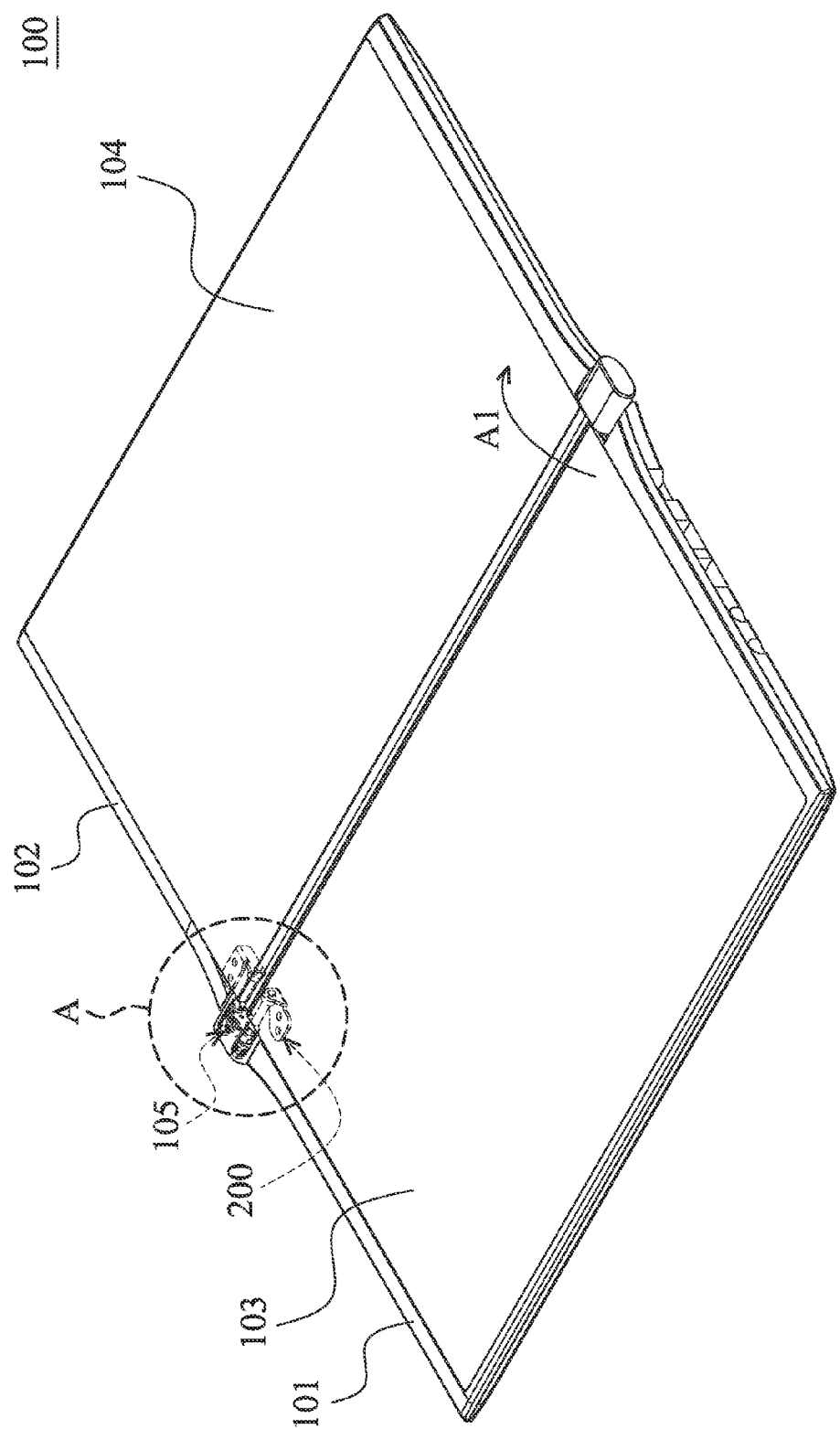
FIG. 1A is a perspective view of collapsible electronic equipment of the invention, wherein the cover is opened at 180 degrees relative to the base.
Figure 1B:
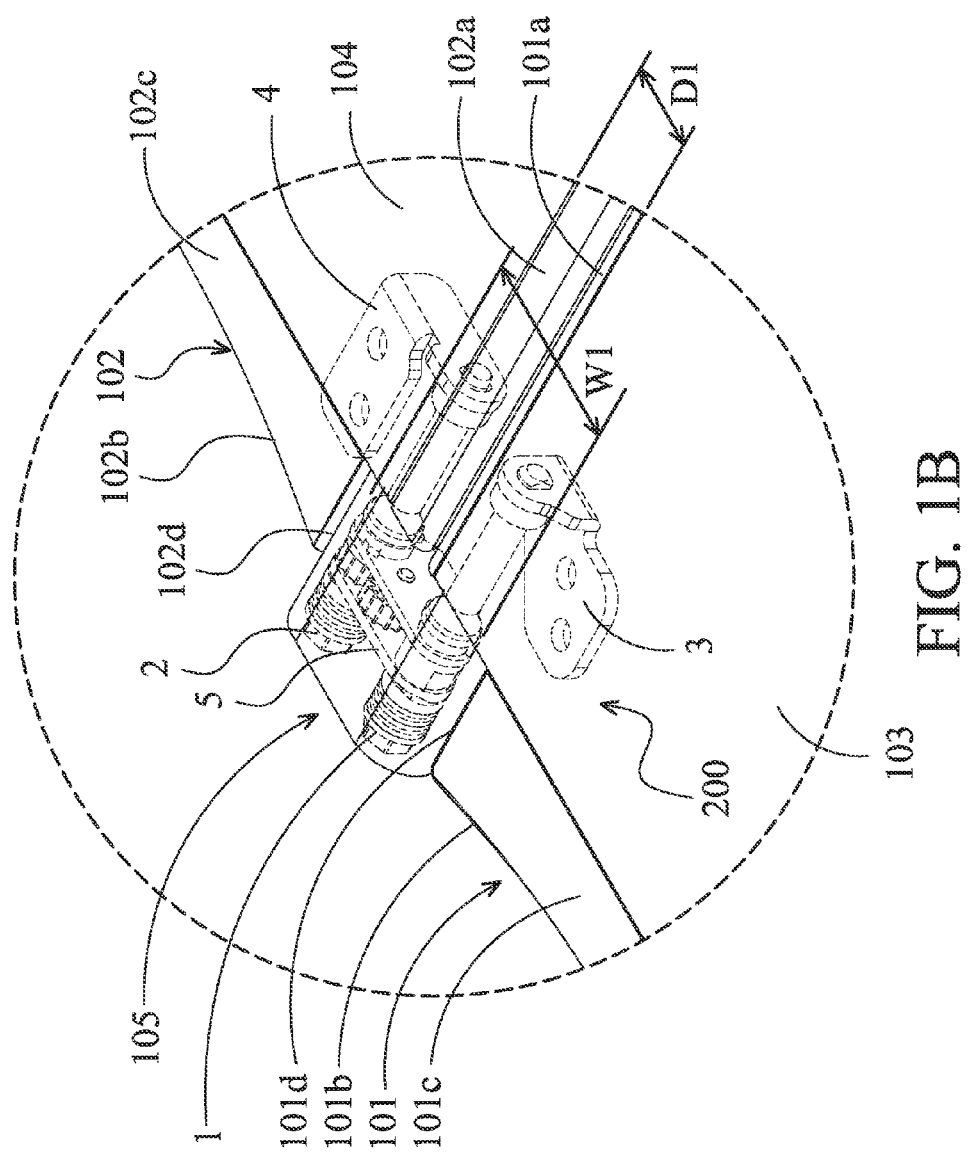
FIG. 1B is an enlarged view of the part A of FIG. 1A.

Please refer to FIGS. 1A and 1B. FIG. 1A is a perspective view of collapsible electronic equipment 100 of the invention. FIG. 1B is an enlarged view of the part A of FIG. 1A. The collapsible electronic equipment 100 may be a portable electronic equipment, such as a notebook or a mobile phone. The collapsible electronic equipment 100 includes two pivot structures 200, a base 101, a cover 102, a first display screen 103, a second display screen 104, and two pivot covers 105. The pivot structures 200 are respectively disposed on two opposite sides of the base 101 and the cover 102. The cover 102 is opened or closed relative to the base 101 by the pivot structure 200.

The base 101 has a first base side 101a, a second base side 101b, and a first display surface 101c. The first base side 101a is close to the second base side 101b. The first base side 101a and the second base side 101b are adjacent to the first display surface 101c. In the embodiment, the first base side 101a is substantially perpendicular to the second base side 101b. The cover 102 has a first cover side 102a, a second cover side 102b, and a second display surface 102c. The first cover side 102a is close to the second cover side 102b, and the first cover side 102a and the second cover side 102b are adjacent to the second display surface 102c.

In the embodiment, the first cover side 102a is substantially perpendicular to the second cover side 102b. The first cover side 102a faces the first base side 101a and is substantially parallel to the first base side 101a.

The first display screen 103 is disposed on the first display surface 101c of the base 101, and the second display screen 104 is disposed on the second display surface 102c of the cover 102. The first display screen 103 and the second display screen 104 may be touch screens.

The pivot structure 200 is connected to the second base side 101b of the base 101 and the second cover side 102b of the cover 102. The pivot structure 200 includes a first pivot assembly 1, a second pivot assembly 2, a bottom stand 3, a stand 4, and a gear mechanism 5. The first pivot assembly 1 is disposed on the second base side 101b and passes through the second base side 101b. Namely, an end of the first pivot assembly 1 is located inside the base 101, and the other end of the first pivot assembly 1 is located outside the base 101. The second pivot assembly 2 is disposed on the second cover side 102b and passes through the second cover side 102b. Namely, an end of the second pivot assembly 2 is located inside the cover 102, and the other end of the second pivot assembly 2 is located outside the cover 102.

In the embodiment, the first pivot assembly 1 and the second pivot assembly 2 are substantially parallel to the first base side 101a and the first cover side 102a, and are substantially perpendicular to the second base side 101b and the second cover side 102b.

The bottom stand 3 is fixed within the base 101 and connected to the end of the first pivot assembly 1. The stand 4 is fixed within the cover 102 and connected to the end of the second pivot assembly 2. The gear mechanism 5 is disposed on the other ends of the first pivot assembly 1 and the second pivot assembly 2 and outside the base 101 and the cover 102.

In the embodiment, the base 101 has a first groove 101d disposed on the second base side 101b, and the cover 102 has a second groove 102d disposed on the second cover side 102b. The second groove 102d and the first groove 101d are communicated with each other. The other end of the first pivot assembly 1 is located within the first groove 101d, and the other end of the second pivot assembly 2 is located within the second groove 102d. The gear mechanism 5 is located within the first groove 101d and the second groove 102d. The pivot cover 105 is located within the first groove 101d and the second groove 102d and covers the other end of the first pivot assembly 1, the other end of the second pivot assembly 2, and the gear mechanisms 5.

Figure 1C:
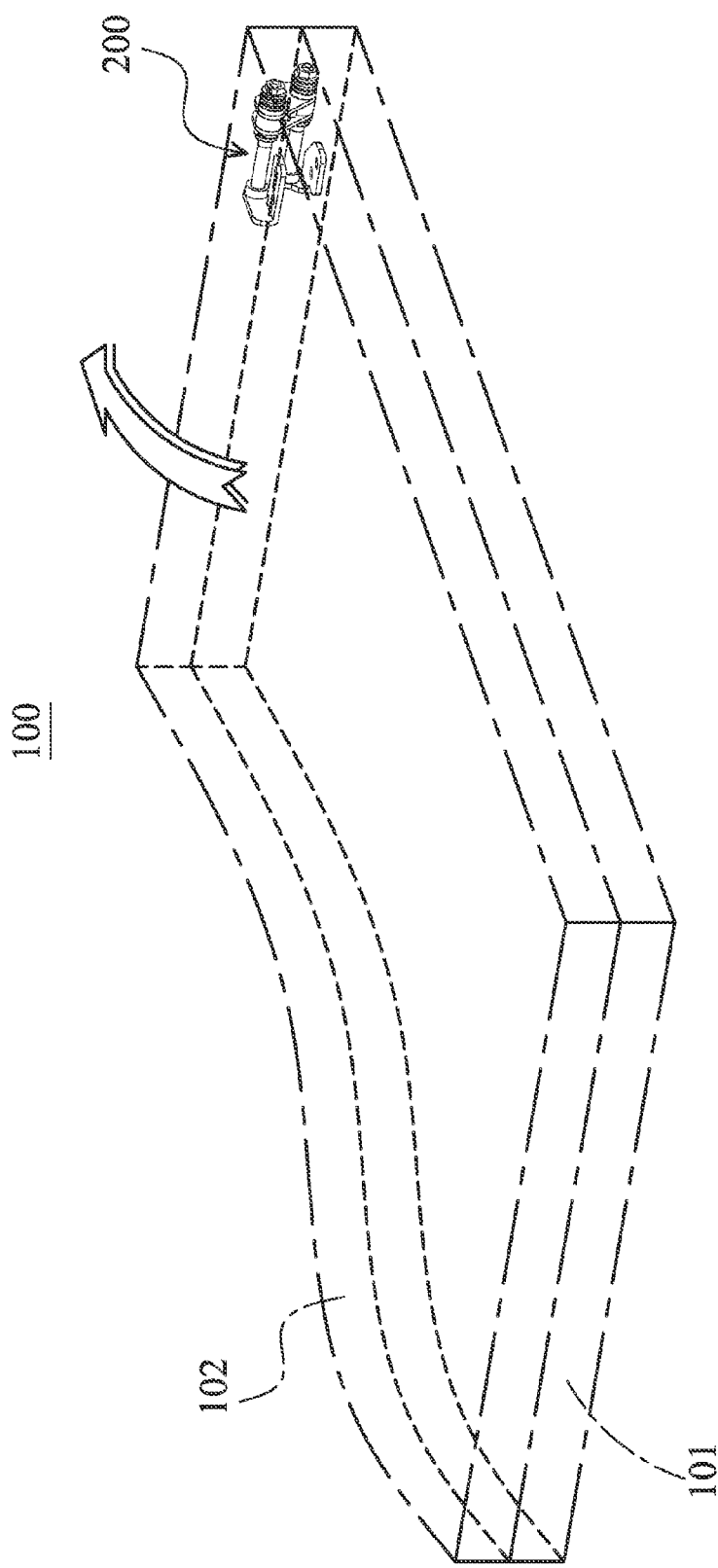
FIG. 1C is a schematic view of the collapsible electronic equipment of the invention, wherein the cover is opened at 0 degree relative to the base.

In the embodiment, the cover 102 is opened or closed relative to the base 101 by the pivot structures 200. As shown in FIGS. 1A and 1B, the cover 102 is at a completely opened status relative to the base 101. There is an opening angle A1 of 180 degrees between the cover 102 and the base 101. When the cover 102 is at the completely opened status, a user may use the collapsible electronic equipment 100 as a tablet personal computer. Further, as shown in FIG. 1C, the cover 102 covers the base 101 and is closed at a closed angle of 0 degree relative to and the base 101.

According to the structure of the pivot structure 200, when the cover 102 is opened at 180 degrees relative to the base 101, the first display screen 103 and the second display screen 104 are located on the same plane, and the maximal length W1 of the gear mechanism 5 is longer than the shortest distance D1 between the first display screen 103 and the second display screen 104. The first display screen 103 is adjacent to an interface of the first base side 101a and the first display surface 101c. The second display screen 104 is adjacent to an interface of the first cover side 102a and the second display surface 102c. Thus, the gap between the first display screen 103 and the second display screen 104 is narrow.

In FIGS. 2A to 4, the detailed structure of the pivot structure 200 is shown. The first pivot assembly 1 has a first shaft 11 and a first torsion structure 12. The first shaft 11 is fixed on the bottom stand 3, and the first torsion structure 12 provides a first rotation torsion. The first shaft 11 has a first non-circular shaft 13. The second pivot assembly 2 has a second shaft 21 and a second torsion structure 22. The second shaft 21 is fixed on the stand 4, and the second torsion structure 22 provides a second rotation torsion greater than the first rotation torsion. The second shaft 21 has a second non-circular shaft 23. The first shaft 11 is substantially parallel to the second shaft 21.

The gear mechanism 5 has two connecting boards 51 and a gear set 53. Each of the connecting boards 51 has two circular holes 52. The first non-circular shaft 13 of the first shaft 11 and the second non-circular shaft 23 of the second shaft 21 pass through the circular holes 52, respectively. The gear set 53 is located between the connecting boards 51. The gear set 53 has a first gear 531, a first transmitting gear 532, a second transmitting gear 533, and an end gear 534. The first gear 531 of the gear set 53 has a non-circular hole 531a, and the first non-circular shaft 13 passes through the non-circular hole 531a. The end gear 534 has a non-circular hole 534a, and the second non-circular shaft 23 passes through the non-circular hole 534a.

Figure 4:
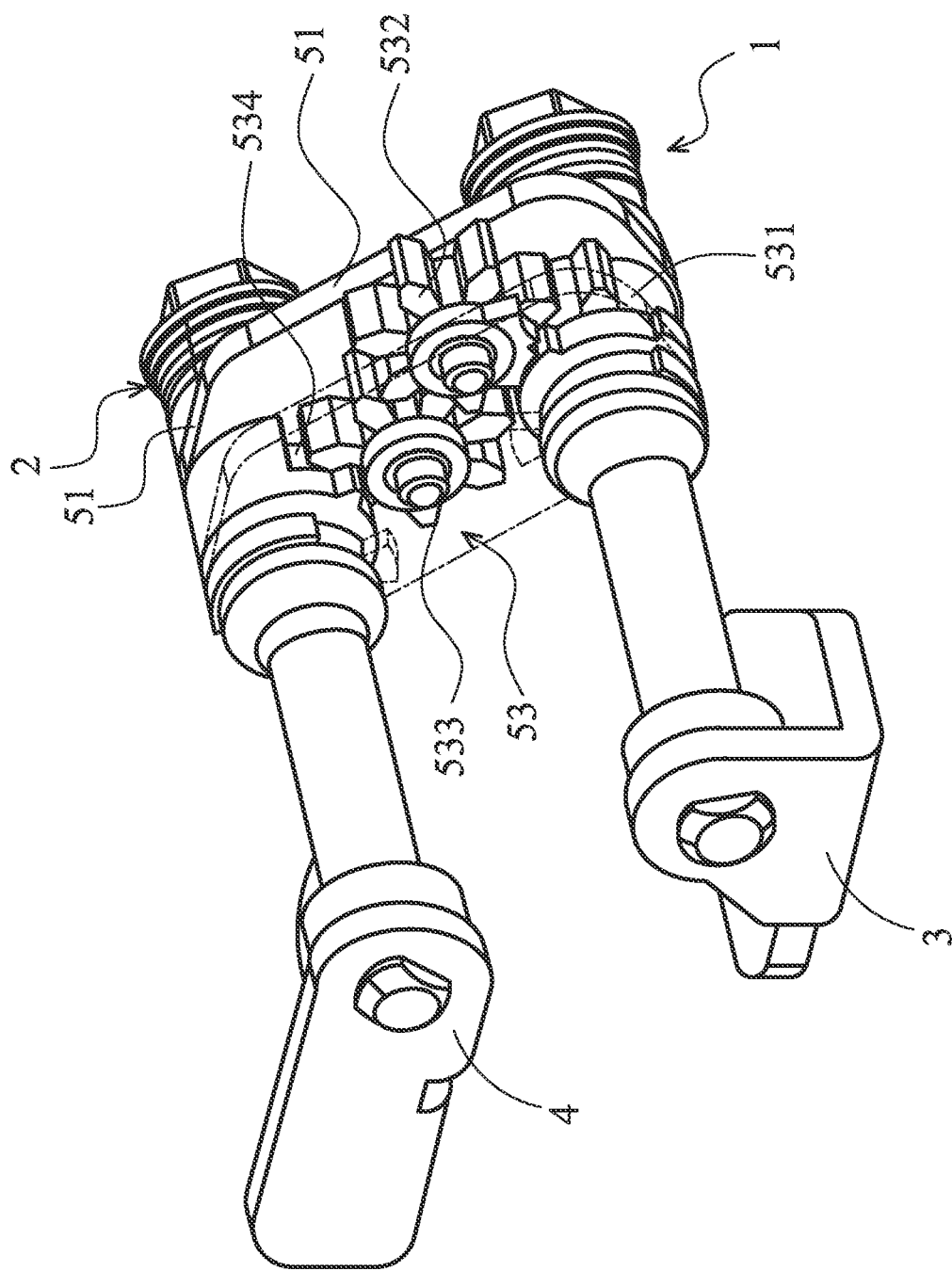
FIG. 4 is another perspective view of the pivot structure of the invention.

As shown in FIG. 4, the first transmitting gear 532 and the second transmitting gear 533 are disposed between the first gear 531 and the end gear 534 of the gear set 53. The first transmitting gear 532 is engaged with the first gear 531 and the second transmitting gear 533. The second transmitting gear 533 is engaged with the end gear 534.

Figure 2A:
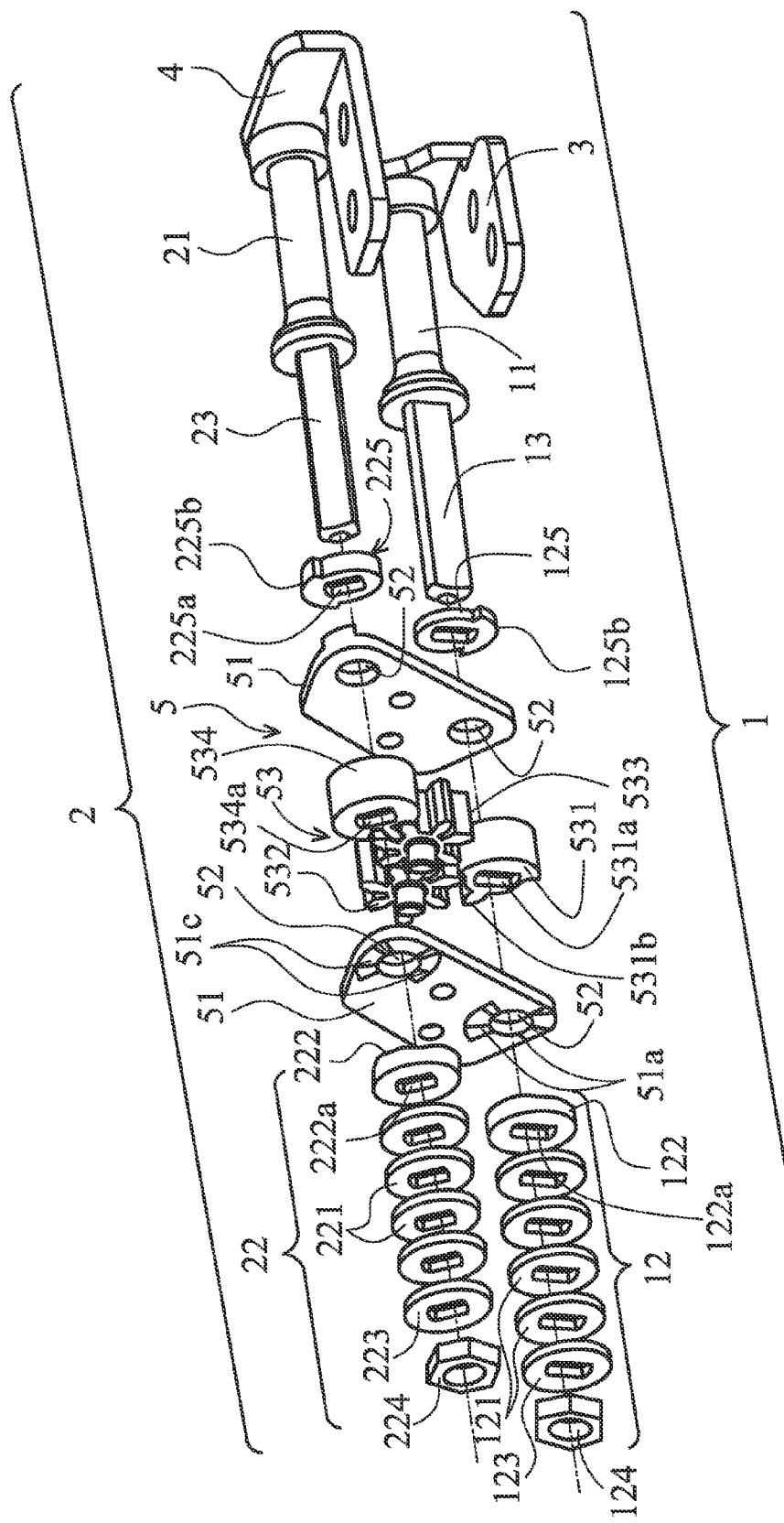
FIG. 2A is an exploded view of a pivot structure of the invention.
Figure 2B:
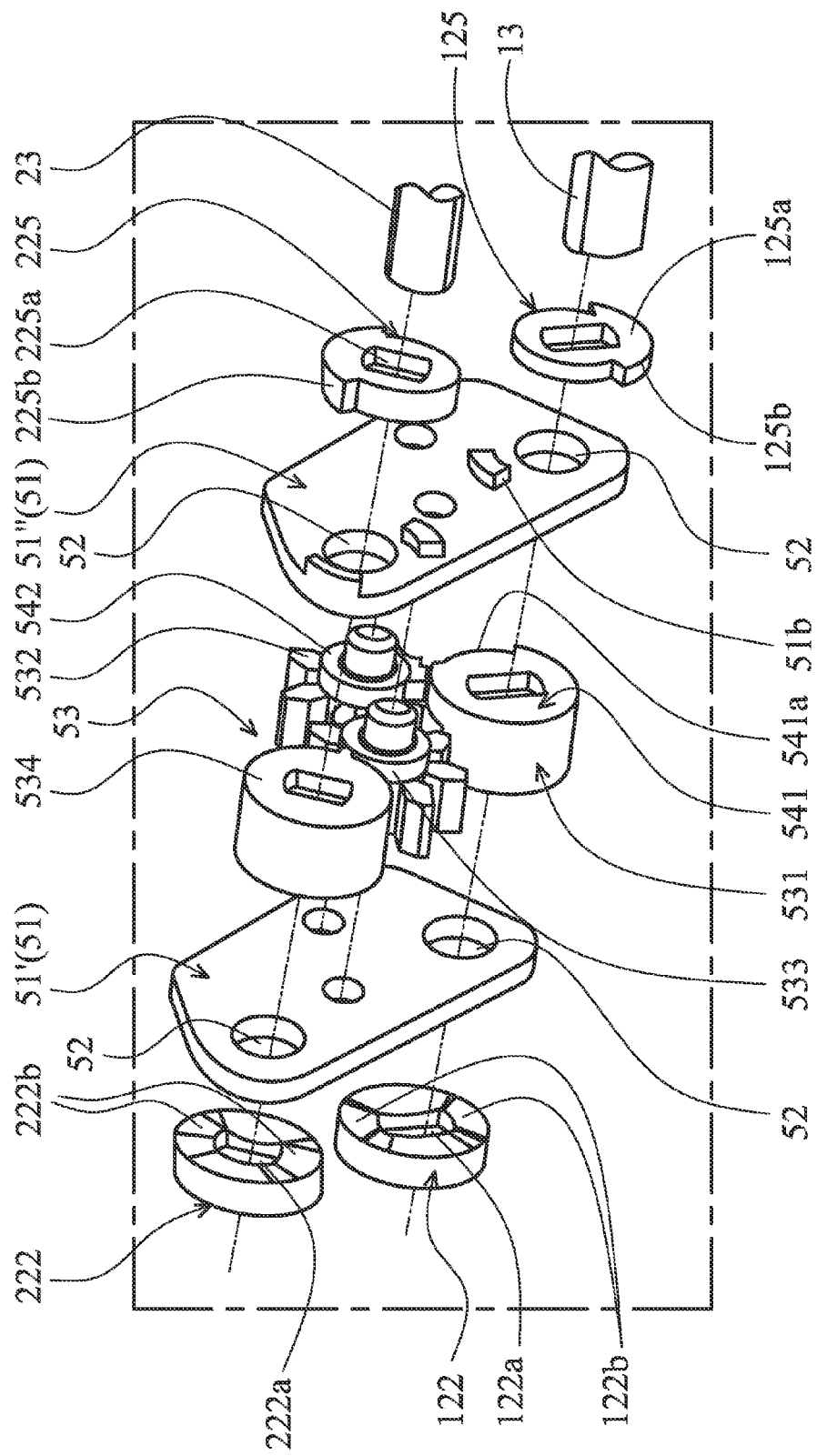
FIG. 2B is a partial exploded view of the pivot structure of the invention.
Figure 3:
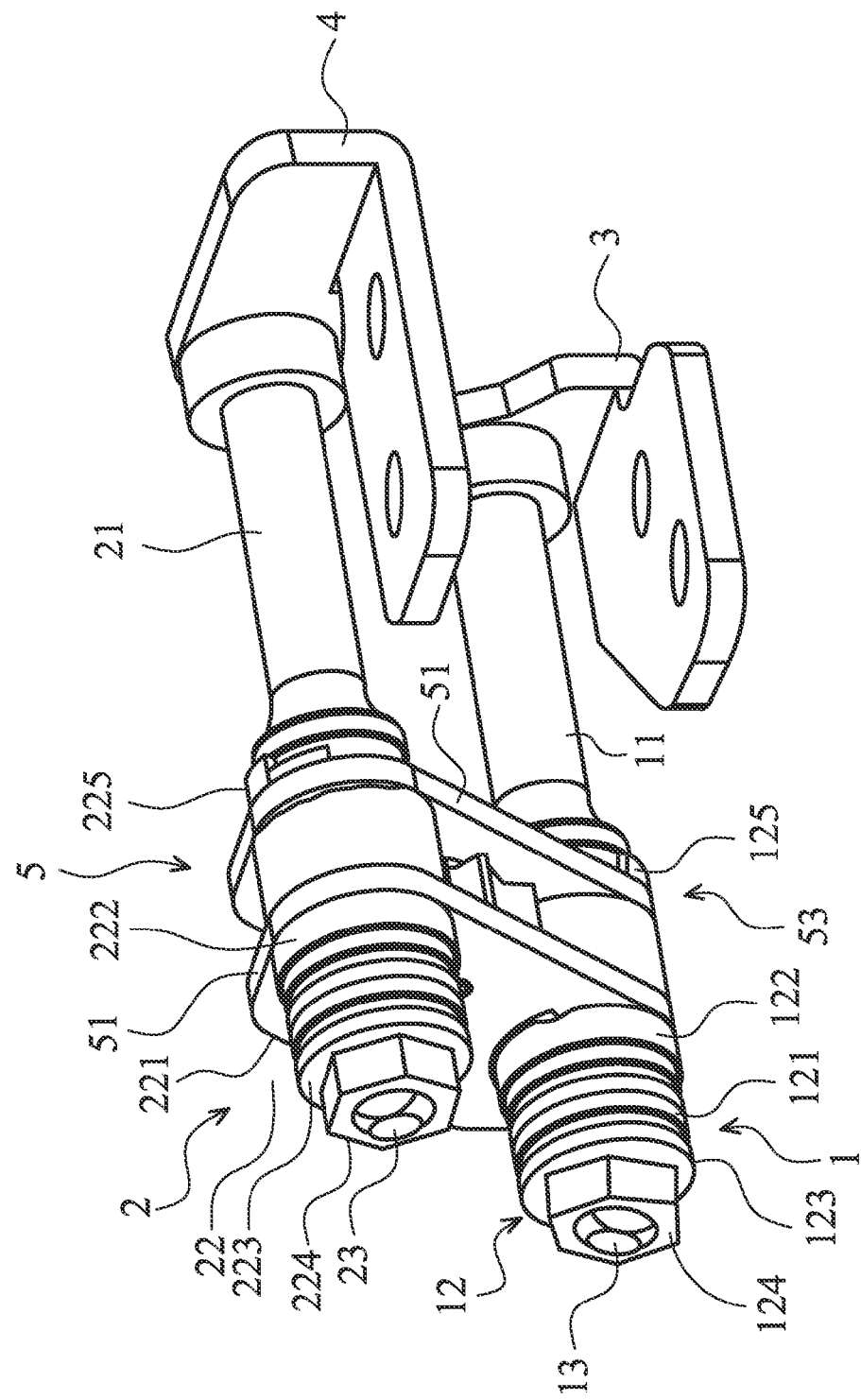
FIG. 3 is a perspective view of the pivot structure of the invention.

The torsion structure 12 of the first pivot assembly 1 is disposed on the first non-circular shaft 13. The torsion structure 12 has a plurality of first disk-shaped elastic pieces 121, a first cam 122, a first retaining board 123, a first nut 124, and a first blocking strip 125. An end of the first non-circular shaft 13 is fastened by the first retaining board 123 and the first nut 124 to force the first disk-shaped elastic pieces 121 pressing the first cam 122. The first cam 122 has a non-circular hole 122a and a plurality of first projections 122b (shown in FIG. 2B). The first non-circular shaft 13 passes through the non-circular hole 122a. The first projections 122b are disposed on the surface of the first cam 122. When the cover 102 is closed at the closed angle relative to the base 101, or when the first pivot assembly 1 is at the closed angle relative to the second pivot assembly 2, the projection 122b is received in a first recess 51a of the connecting board 51', which is adjacent to the projection 122b. As shown in FIG. 2B, the first blocking strip 125 is disposed on the outside of the connecting board 51"(sub-connecting board), which is not adjacent to the first cam 122 of the first pivot assembly 1. The first blocking strip 125 has a non-circular hole 125a. The first non-circular shaft 13 passes through the non-circular hole 125a. The first blocking strip 125 has a sector-shaped portion 125b disposed an edge thereof. The sector-shaped portion 125b corresponds to a blocking lump 51b extended from the connecting board 51" (as shown in FIG. 2B) to limit the connecting board 51" rotating about the first shaft 11 in a rotation angle.

Equally, the torsion structure 22 of the second pivot assembly 2 is disposed on the second non-circular shaft 23 of the second shaft 21. The torsion structure 22 has a plurality of second disk-shaped elastic pieces 221, a second cam 222, a second retaining board 223, a second nut 224, and a second blocking strip 225. The second cam 222 is pressed by the second disk-shaped elastic pieces 221. An end of the second non-circular shaft 23 is fastened by the second retaining board 223 and the second nut 224 to force the second disk-shaped elastic pieces 221 pressing the second cam 222. The second cam 222 has a non-circular hole 222a and a plurality of second projections 222b (shown in FIG. 2B). The second non-circular shaft 23 passes through the non-circular hole 222a. The second projections 222b are disposed on the surface of the second cam 222. When the cover 102 is closed at the closed angle relative to the base 101, or when the first pivot assembly 1 is at the closed angle relative to the second pivot assembly 2, the projection 222b is received in the second recess 51c of an adjacent connecting board 51', which is adjacent to the projection 122b. As shown in FIG. 2B, the second blocking strip 225 is disposed on the outside of the connecting board 51", which is not adjacent to the second cam 222 of the second pivot assembly 2. The second blocking strip 225 has a non-circular hole 225a. The first non-circular shaft 13 passes through the non-circular hole 225a. The edge of the first non-circular shaft 13 has a sector-shaped portion 225b. The sector-shaped portion 225b corresponds to a blocking lump 51d extended from the connecting board 51"(as shown in FIG. 2B) to limit the connecting board 51" rotating about the second shaft 21 in the rotation angle.

Please also refer to FIG. 1B, the cover 102 can be rotated about the base 101 between the closed angle (0 degree) and the opening angle (180 degrees) to be opened or closed relative to the base 101 by the first pivot assembly 1 and the second pivot assembly 2 of the embodiment. Further, the cover 102 can be kept on a predetermined position at a predetermined angle. Namely, the stand 4 can be rotated about the bottom stand 3 between the closed angle and the opening angle by the first pivot assembly 1 and the second pivot assembly 2. Further, the stand 4 can be kept on the predetermined position at the predetermined angle. By the teeth shapes and the changes of the angle of the first gear 531 and the end gear 534, when the cover 102 and the stand 4 are rotated to be opened or closed between 0 degree to 180 degrees relative to the base 101 and the bottom stand 3, the connecting boards 51 are rotated about the first shaft 11 of the first pivot assembly 1 and the second shaft 21 of the second pivot assembly 2 at a specified angle between a first middle angle (such as 40 degrees) and a second middle angle (such as 140 degrees). The connecting boards 51 are rotated about the first shaft 11 and are not rotated about the second shaft 21 of the first pivot assembly 1 at a non-specified angle between 0 degree and 40 degrees or between 140 degrees and 180 degrees.

Please refer to FIG. 6 to FIG. 10, which are schematic views of opening movements of the cover 102 between 0 degree and 180 degrees relative to the base 101, wherein closing movements of the cover 102 relative to the base 101 are the reversal of the opening movements.

Figure 6:
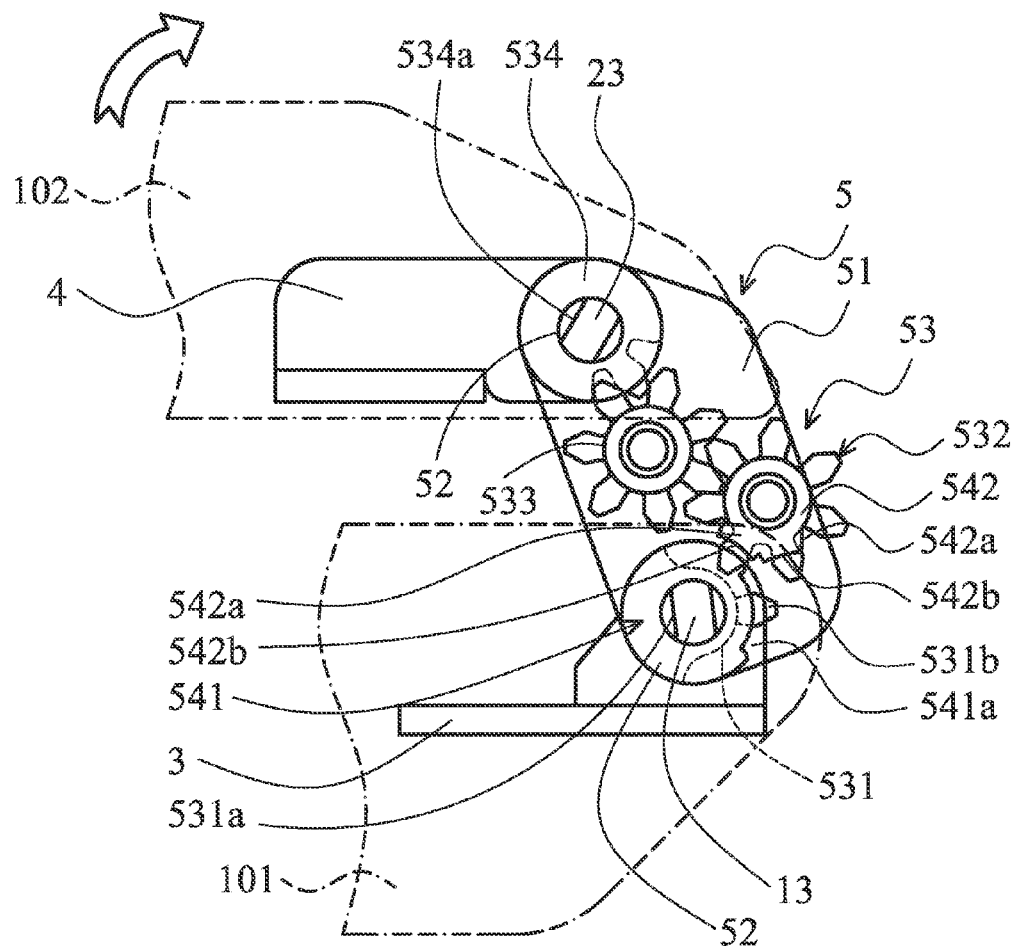
FIG. 6 is a schematic view of the collapsible electronic equipment of the invention, wherein the cover is at 0 degree relative to the base.
Figure 7:
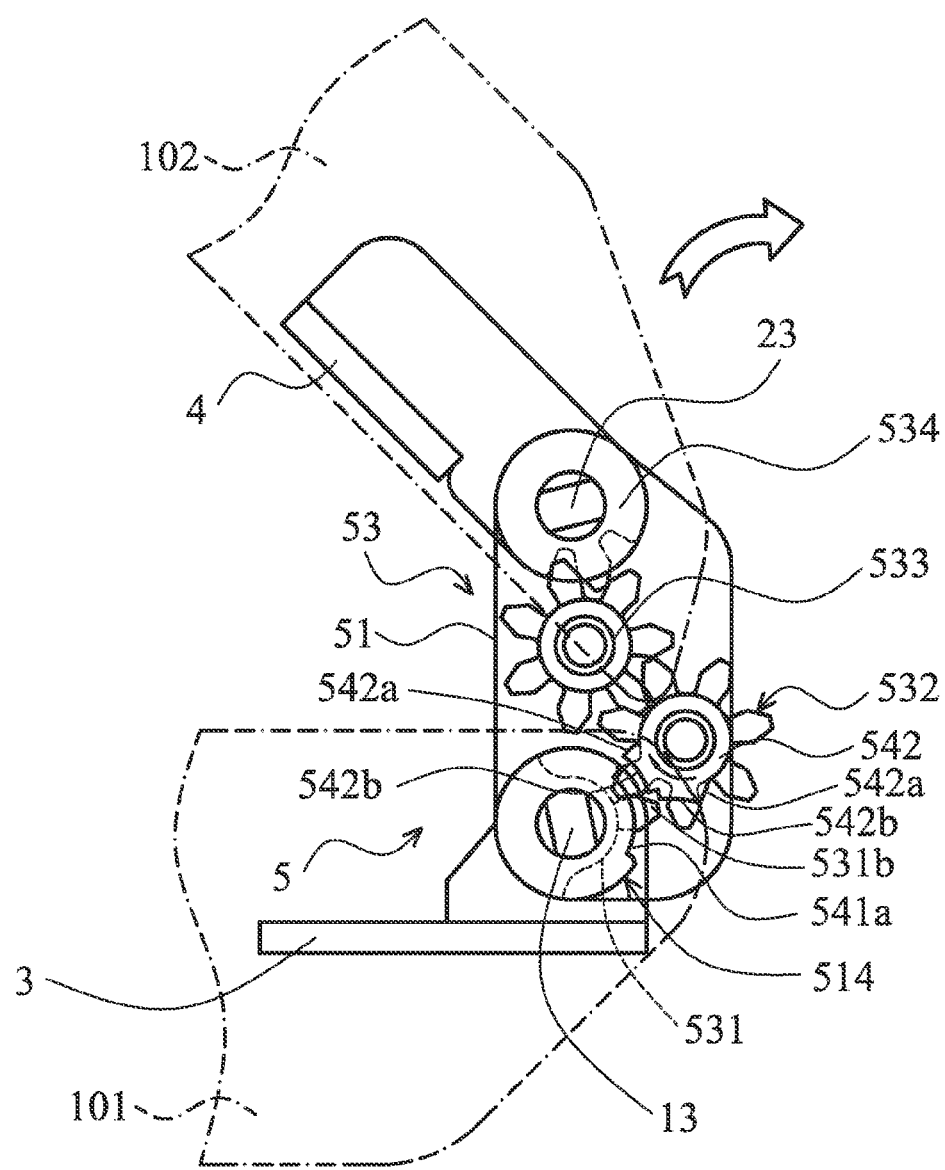
FIG. 7 is a schematic view of the collapsible electronic equipment of the invention, wherein the cover is at 40 degrees relative to the base.

Please refer to FIG. 6 and FIG. 7, regarding the gear set 53 of the gear mechanism 5. An A-shaped teeth portion 531b of the first gear 531 departs from the first transmitting gear 532 of the gear set 53 when the stand 4 is rotated between 0 degree to the first middle angle of 40 degrees relative to the bottom stand 3. Thus, the connecting boards 51 are rotated about the first non-circular shaft 13 of the first shaft 11 of the first pivot assembly 1. In addition, the connecting boards 51 are not rotated about the second non-circular shaft 23 of the second shaft 21 of the second pivot assembly 2. After the cover 102 and the stand 4 are rotated over the first middle angle of 40 degrees relative to the base 101 and the bottom stand 3, as shown in FIG. 7, the A-shaped teeth portion 531b is engaged with the first transmitting gear 532.

Figure 8:
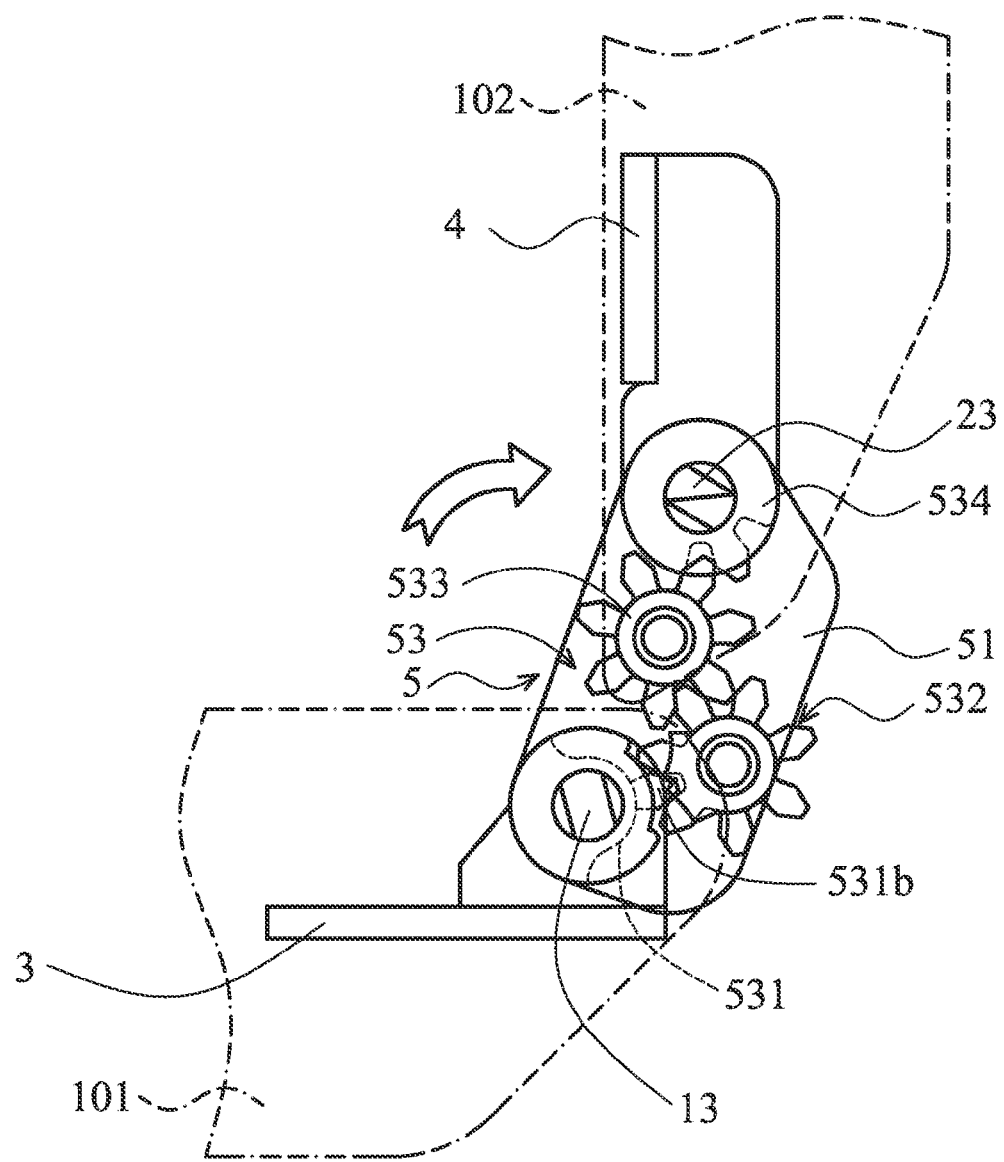
FIG. 8 is a schematic view of the collapsible electronic equipment of the invention, wherein the cover is at 90 degrees relative to the base.
Figure 9:
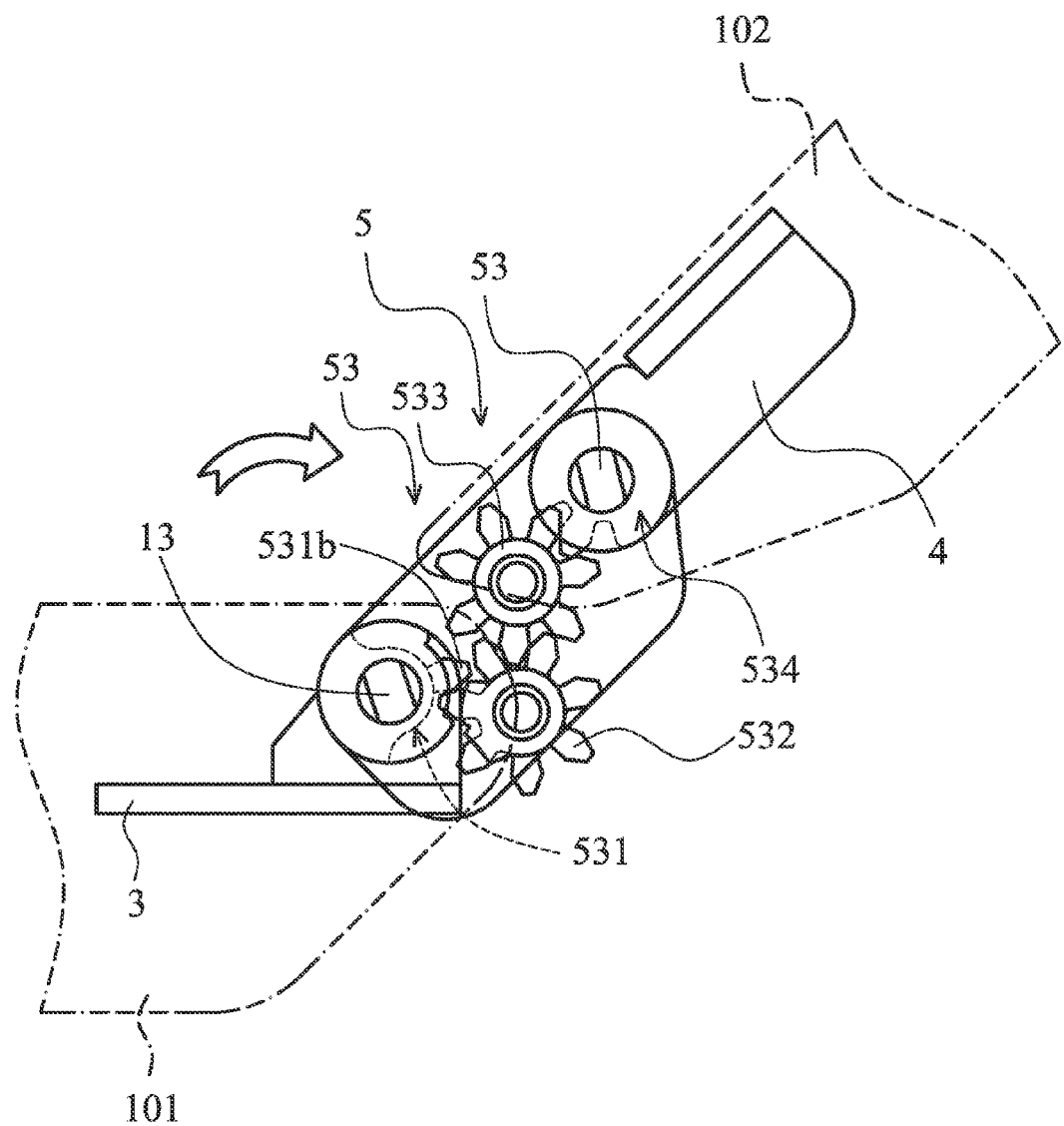
FIG. 9 is a schematic view of the collapsible electronic equipment of the invention, wherein the cover is at 140 degrees relative to the base.

Please refer to FIG. 7 to FIG. 9, when the cover 102 and the stand 4 are rotated between the first middle angle of 40 degrees and the second middle angle of 140 degrees relative to the base 101 and the bottom stand 3. The A-shaped teeth portion 531b drives the first transmitting gear 532, the first transmitting gear 532 drives the second transmitting gear 533, and the second transmitting gear 533 drives the end gear 534. The connecting board 51 may be rotated about 50 degrees about the first non-circular shaft 13 of the first shaft 11 of the first pivot assembly 1, and the connecting board 51 may be rotated about 50 degrees relative to the second non-circular shaft 23 of the second shaft 21 of the second pivot assembly 2.

Figure 10:
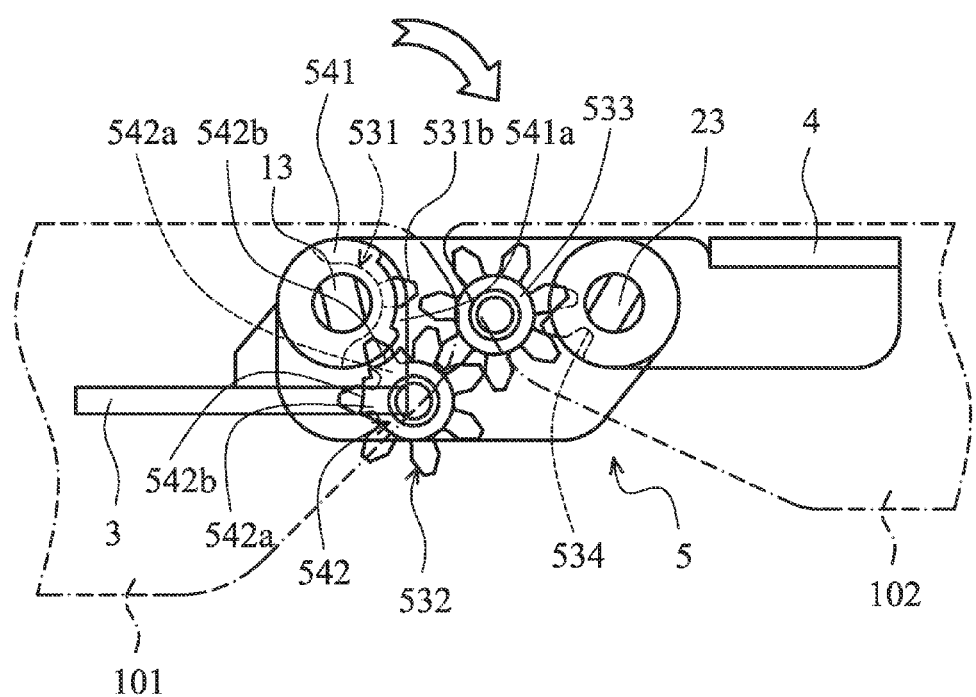
FIG. 10 is a schematic view of the collapsible electronic equipment of the invention, wherein the cover is at 180 degrees relative to the base.
Figure 11:
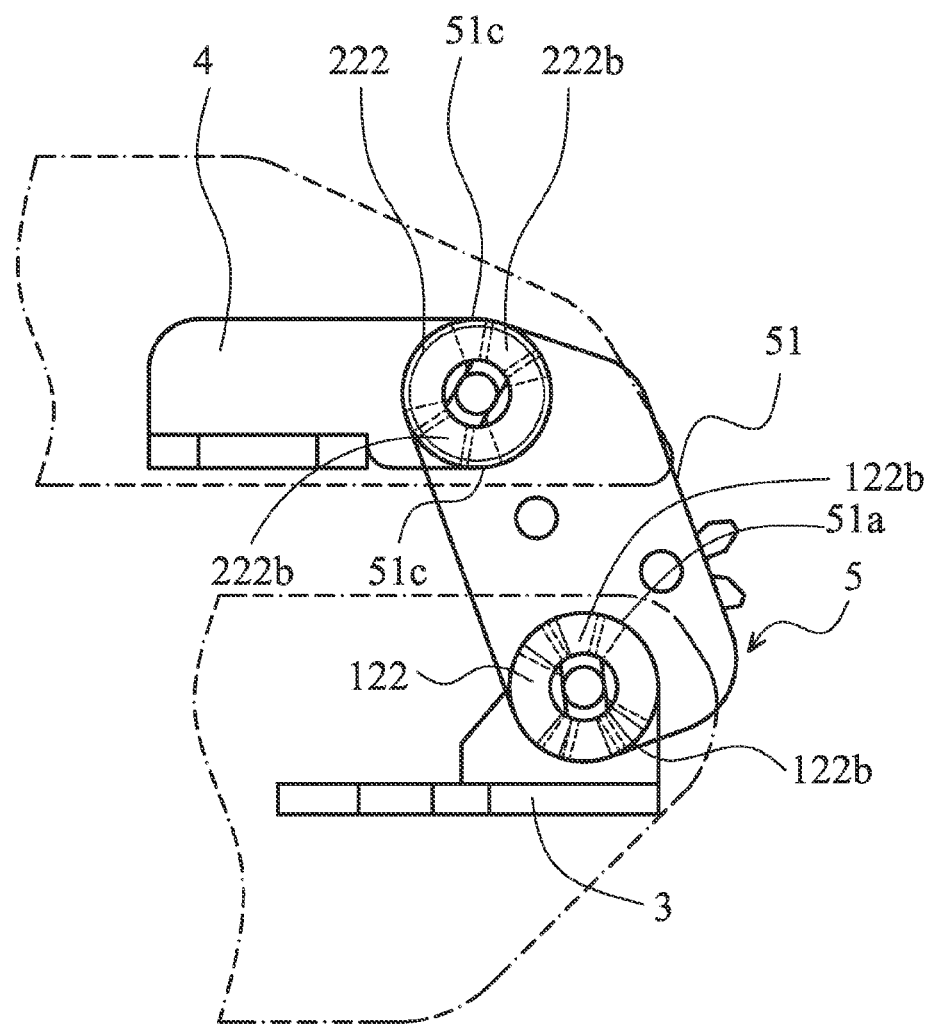
FIG. 11 is a schematic view of the collapsible electronic equipment of the invention, wherein the cover is at 0 degree relative to the base.

Please refer to FIG. 9 to FIG. 10. When the cover 102 and the stand 4 are rotated between the second middle angle of 140 degrees and the opening angle of 180 degrees relative to the base 101 and the bottom stand 3, the A-shaped teeth portion 531b departs from the first transmitting gear 532 of the gear set 53. Thus, the connecting boards 51 are rotated about the first non-circular shaft 13 of the first shaft 11 of the first pivot assembly 1 between the second middle angle (140 degrees) and the opening angle (180 degrees), as shown in FIG. 10. In addition, the connecting boards 51 are not rotated about the second non-circular shaft 23 of the second shaft 21 of the second pivot assembly 2 between the second middle angle (140 degrees) and the opening angle (180 degrees).

Obviously, the pivot structure 200 of the embodiment has a function with intermittent transmission. Since the torsion of the second pivot assembly 2 is greater than the torsion of the first pivot assembly 1, the second pivot assembly 2 is not rotated and the first pivot assembly 1 with lower torsion is rotated when the cover is opened at the non-specified angle relative to the base 101. When the cover is opened at the specified angle between 40 degrees and 140 degrees relative to the base 101, the torsion is transmitted by the gear set 53 of the gear mechanism 5 to force the second pivot assembly 2 with greater torsion to rotate?. Thus, when the cover 102 is opened at 180 degrees relative to base 101, as shown in FIG. 1, the gap between the cover 102 and the base 101 is narrow. The first display surface 101c of the base 101 and the second display screen 104 of the cover 102 are located on the same plane, and the collapsible electronic equipment 100 may be opened like a book.

Figure 5:
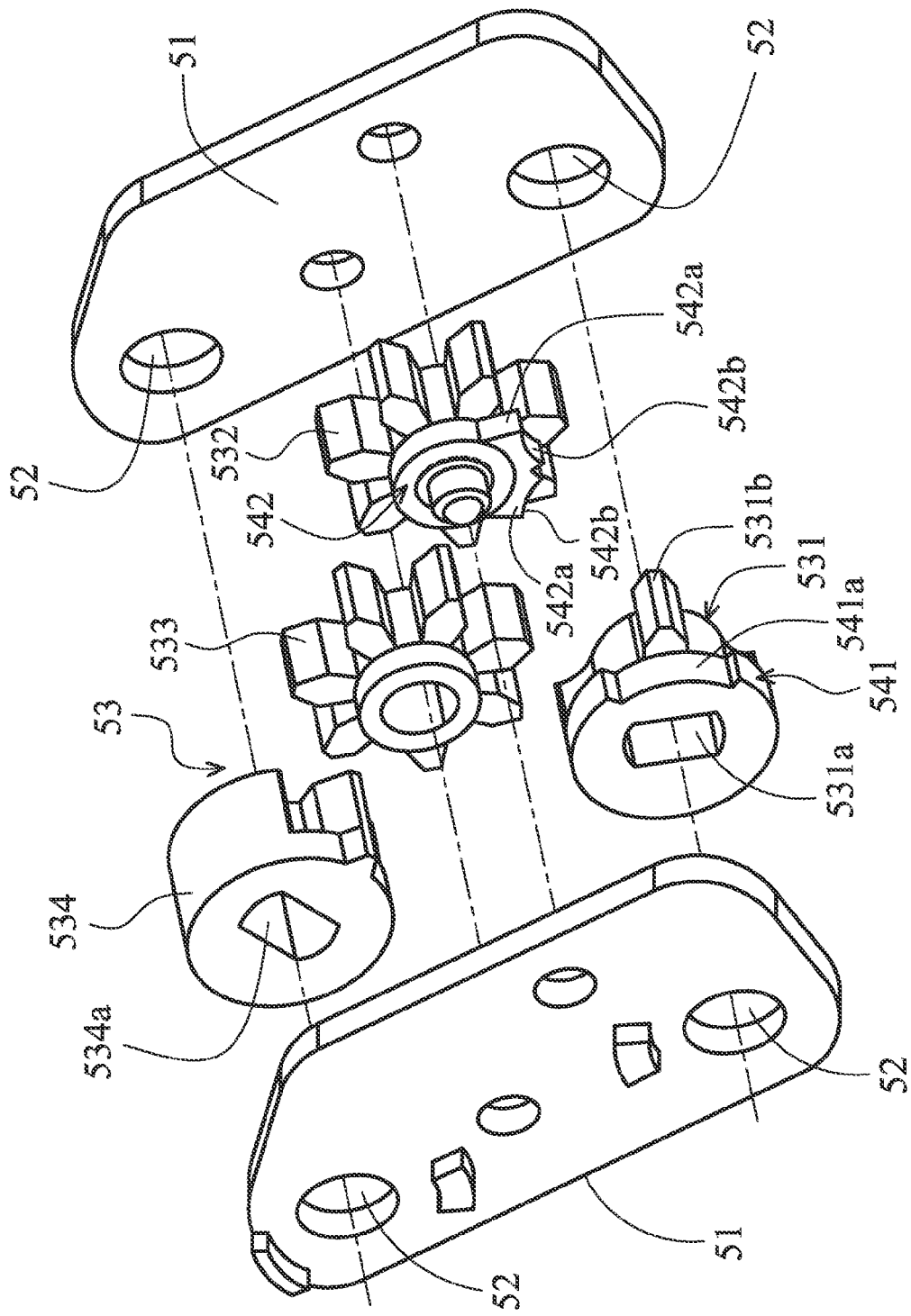
FIG. 5 is an exploded view of the pivot structure of the invention.

Further, please also refer to FIG. 5, regarding to the gear set 53 of the gear mechanism 5, the first gear 531 has a first retaining cam 541 having a sector groove 541a. The A-shaped teeth portion 531b is located in the middle of the sector groove 541a. The first transmitting gear 532 has a second retaining cam 542 having two protrusions 542a. Each of the protrusions 542a has an arc surface 542b. When the cover 102 and the stand 4 are rotated at a non-specified angle between 0 degree and 40 degrees or between 140 degrees and 180 degrees relative to the base 101 and the bottom stand 3, the arc surfaces 542b of the protrusions 542a are close to the circumference of the first retaining cam 541 outside of the sector groove 541a.

In the embodiment, the first retaining cam 541 and the second retaining cam 542 are formed as a retaining mechanism. When the cover 102 is at the non-specified angle between 0 degree and 40 degrees or between 140 degrees and 180 degrees relative to the base 101, the arc surfaces 542b of the protrusions 542a are close to the circumference of the first retaining cam 541 outside of the sector groove 541a. As shown in FIG. 6 and FIG. 10, the gear set 53 can not be driven when the cover 102 is at the non-specified angle relative to the base 101, and thus the collapsible electronic equipment 100 can be prevented from being opened.

In conclusion, the cover of the collapsible electronic equipment can be opened at 180 degrees relative to the base, and the gap between the cover and the base is narrow. Moreover, the display surfaces of the cover and the base are located on the same horizontal plane, and thus the displays of the display screens of the cover and the base is greater. Further, when the cover is inclined to a predetermined angle relative to the base, the cover is kept at a predetermined position. Thus, the use of the collapsible electronic equipment is convenient.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A pivot structure, comprising;
   a gear mechanism having at least one connecting board and a gear set, wherein the gear set comprises a first gear, a plurality of transmitting gears, and an end gear, wherein the first gear, the transmitting gears, and the end gear are engaged in sequence;
   a first pivot assembly having a first shaft passing through the connecting board and the first gear; and
   a second pivot assembly having a second shaft passing through the connecting board and the end gear,
   a bottom stand disposed on the first shaft;
   a stand disposed on the second shaft;
   wherein the transmitting gears comprise a first transmitting gear, and the first gear has an A-shaped teeth portion departed from the first transmitting gear when the stand is rotated between 0 degree and a first middle angle relative to the bottom stand, and the A-shaped teeth portion drives the first transmitting gears to rotate the end gear,
   wherein the connecting board is rotated about the second shaft of the second pivot assembly when the stand is rotated between the first middle angle and a second middle angle relative to the bottom stand, and the A-shaped teeth portion departs from the first transmitting gear when the stand is rotated between the second middle angle and 180 degrees relative to the bottom stand.

2. The pivot structure as claimed in claim 1, wherein the stand is rotated between a closed angle and an opening angle relative to the bottom stand by the first pivot assembly and the second pivot assembly, and the stand is kept at a predetermined angle relative to the bottom stand.

3. The pivot structure as claimed in claim 2, wherein when the stand is rotated between 0 degree to 180 degrees relative to the bottom stand by the first gear and the end gear, the connecting board is rotated about the first shaft of the first pivot assembly and the second shaft of the second pivot assembly at a specified angle between the first middle angle the second middle angle, wherein the connecting board is rotated about the first shaft of the first pivot assembly at a non-specified angle except the specified angle.

4. The pivot structure as claimed in claim 3, wherein the first middle angle is 40 degrees, and the second middle angle is 140 degrees.

5. The pivot structure as claimed in claim 1, wherein the first shaft is substantially parallel to the second shaft.

6. The pivot structure as claimed in claim 1, wherein the first shaft has a first non-circular shaft, the second shaft has a second non-circular shaft, and the connecting board has two circular holes with the first non-circular shaft and the second non-circular shaft passing therethrough, wherein the first gear has a non-circular hole with the first non-circular shaft passing therethrough, and the end gear has another non-circular hole with the second non-circular shaft of the second shaft passing therethrough.

7. The pivot structure as claimed in claim 1, wherein the first pivot assembly has a first torsion structure, the second pivot assembly has a second torsion structure, the first shaft has a first non-circular shaft, and the second shaft has a second non-circular shaft, wherein the first torsion structure is disposed on the first non-circular shaft and provides a first rotation torsion, and the second torsion structure is disposed on the second non-circular shaft and provides a second rotation torsion greater than the first rotation torsion.

8. The pivot structure as claimed in claim 7, wherein the first torsion structure comprises;
   a first cam having a first projection and a non-circular hole with the first non-circular shaft passing therethrough;
   a plurality of first disk-shaped elastic pieces pressing the first cam; and
   a first retaining board disposed on an end of the first non-circular shaft to force the first disk-shaped elastic pieces pressing the first cam; and
   a first nut disposed on the end of the first non-circular shaft to force the first disk-shaped elastic pieces pressing the first cam;
   wherein when the first pivot assembly is at a closed angle relative to the second pivot assembly, the first projection is received in a first recess of the connecting board adjacent to the first projection.

9. The pivot structure as claimed in claim 7, wherein the first torsion structure comprises;
   a second cam having a second projection and a non-circular hole with the second non-circular shaft passing therethrough;
   a plurality of second disk-shaped elastic pieces pressing the second cam; and
   a second retaining board and a second nut disposed on an end of the second non-circular shaft to force the second disk-shaped elastic pieces pressing the second cam;
   wherein when the first pivot assembly is at a closed angle relative to the second pivot assembly, and the second projection is received in a second recess of the connecting board.

10. A collapsible electronic equipment, comprising;
    a base having a first base side and a second base side close to the first base side;
    a cover having a first cover side and a second cover side, wherein the first cover side is substantially parallel to the first base side and is close to the second cover side; and
    a pivot structure, comprising:

a gear mechanism having at least one connecting board and a gear set, wherein the gear set comprises a first gear, a plurality of transmitting gears, and an end gear, wherein the first gear, the transmitting gears, and the end gear are engaged in sequence;

a first pivot assembly, disposed on the second base side, having a first shaft passing through the connecting board and the first gear; and a second pivot assembly, disposed on the second cover side, having a second shaft passing through the connecting board and the end gear;

wherein the cover is opened or closed relative to the base by the pivot structure wherein the transmitting gears comprise a first transmitting gear, and the first gear has an A-shaped teeth portion departed from the first transmitting gear when the stand is rotated between 0 degree and a first middle angle relative to the bottom stand, and the A-shaped teeth portion drives the first transmitting gears to rotate the end gear, wherein the connecting board is rotated about the second shaft of the second pivot assembly when the stand is rotated between the first middle angle and a second middle angle relative to the bottom stand, and the A-shaped teeth portion departs from the first transmitting gear when the stand is rotated between the second middle angle and 180 degrees relative to the bottom stand.

11. The collapsible electronic equipment as claimed in claim 10, wherein the first pivot assembly and the second pivot assembly are substantially parallel to the first base side and the first cover side, and are substantially perpendicular to the second base side and the second cover side.

12. The collapsible electronic equipment as claimed in claim 10, wherein an end of the first pivot assembly is located inside the base, and the other end of the first pivot assembly is located outside the base, wherein an end of the second pivot assembly is located inside the cover, and the other end of the second pivot assembly is located outside the cover, wherein the gear mechanism is located outside of the base and the cover.

13. The collapsible electronic equipment as claimed in claim 12, wherein the second base side has a first groove, the second cover side has a second groove communicated with the first groove, the other end of the first pivot assembly is located within the first groove, the other end of the second pivot assembly is located within the second groove, and the gear mechanism is located in the first groove and the second groove.

14. The collapsible electronic equipment as claimed in claim 10, further comprising a first display screen disposed on the base and a second display screen disposed on the cover, wherein the first display screen is a touch screen.

15. The collapsible electronic equipment as claimed in claim 14, wherein the second display screen is a touch screen.

16. The collapsible electronic equipment as claimed in claim 14, wherein when the cover is opened at 180 degrees relative to the base, the maximal length of the gear mechanism is longer than the shortest distance between the first display screen and the second display screen.

17. The collapsible electronic equipment as claimed in claim 14, wherein the first display screen is adjacent to the first base side, and the second display screen is adjacent to the first cover side.

18. A pivot structure, comprising;

a gear mechanism having at least one connecting board and a gear set, wherein the gear set comprises a first gear, a plurality of transmitting gears, and an end gear, wherein the first gear, the transmitting gears, and the end gear are engaged in sequence;

a first pivot assembly having a first shaft passing through the connecting board and the first gear; and a second pivot assembly having a second shaft passing through the connecting board and the end gear, wherein the first shaft has a first non-circular shaft, the second shaft has a second non-circular shaft, and the connecting board has two circular holes with the first non-circular shaft and the second non-circular shaft passing therethrough, wherein the first gear has a non-circular hole with the first non-circular shaft passing therethrough, and the end gear has another non-circular hole with the second non-circular shaft of the second shaft passing therethrough.

19. A collapsible electronic equipment, comprising;

a base having a first base side and a second base side close to the first base side;

a cover having a first cover side and a second cover side, wherein the first cover side is substantially parallel to the first base side and is close to the second cover side; and a pivot structure, comprising:

a gear mechanism having at least one connecting board and a gear set, wherein the gear set comprises a first gear, a plurality of transmitting gears, and an end gear, wherein the first gear, the transmitting gears, and the end gear are engaged in sequence;

a first pivot assembly, disposed on the second base side, having a first shaft passing through the connecting board and the first gear; and a second pivot assembly, disposed on the second cover side, having a second shaft passing through the connecting board and the end gear;

wherein the cover is opened or closed relative to the base by the pivot structure wherein the first shaft has a first non-circular shaft, the second shaft has a second non-circular shaft, and the connecting board has two circular holes with the first non-circular shaft and the second non-circular shaft passing therethrough, wherein the first gear has a non-circular hole with the first non-circular shaft passing therethrough, and the end gear has another non-circular hole with the second non-circular shaft of the second shaft passing therethrough.

* * * * *